(12) United States Patent
Lee et al.

(10) Patent No.: US 9,413,196 B2
(45) Date of Patent: Aug. 9, 2016

(54) WIRELESS POWER TRANSFER

(75) Inventors: Jae Seung Lee, Ann Arbor, MI (US);
Paul Donald Schmalenberg, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 973 days.

(21) Appl. No.: 13/442,238

(22) Filed: Apr. 9, 2012

(65) Prior Publication Data

US 2013/0264885 A1 Oct. 10, 2013

(51) Int. Cl.
*H01F 38/00* (2006.01)
*H02J 17/00* (2006.01)
*H01F 38/14* (2006.01)
*H01F 27/28* (2006.01)

(52) U.S. Cl.
CPC ............ *H02J 17/00* (2013.01); *H01F 27/2804* (2013.01); *H01F 38/14* (2013.01); *H01F 2027/2809* (2013.01)

(58) Field of Classification Search
USPC ........................................................ 307/104
See application file for complete search history.

(56) References Cited

U.S. PATENT DOCUMENTS

| 6,914,508 | B2 | 7/2005 | Ferencz et al. | |
| 7,973,635 | B2 | 7/2011 | Baarman et al. | |
| 2011/0127845 | A1 | 6/2011 | Walley et al. | |
| 2011/0133568 | A1 | 6/2011 | Wang et al. | |
| 2012/0262000 | A1 * | 10/2012 | Urano | 307/104 |
| 2012/0280872 | A1 * | 11/2012 | Werner et al. | 343/753 |

* cited by examiner

*Primary Examiner* — Rexford Barnie
*Assistant Examiner* — Dru Parries
(74) *Attorney, Agent, or Firm* — Dinsmore & Shohl LLP

(57) ABSTRACT

A revised coil loop structure is combined with metamaterials designed to contain and redirect the electromagnetic field to produce an improved inductive coupling system. The efficiency of the inductive power transfer system is increased relative to existing technologies by overcoming the negative effects of distance and misalignment. The transmitting and receiving coils are both constructed by connecting a series of printed circuit boards (PCBs). The individual PCBs are then stacked on top of one another and connected to produce the transmitting and receiving coils. The transmitting and receiving coils further feature a coil shape designed to allow the coils to be actively and variably tuned to one another. The efficiency of power transfer in the system is additionally increased through the use of metamaterials. The metamaterial is used as a backing for the coils and reduces the amount of magnetic flux found on the back of the coils.

13 Claims, 6 Drawing Sheets

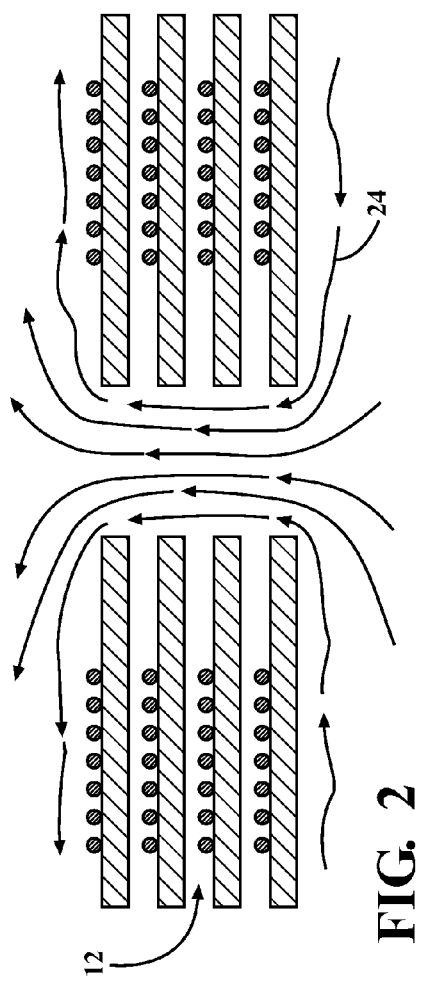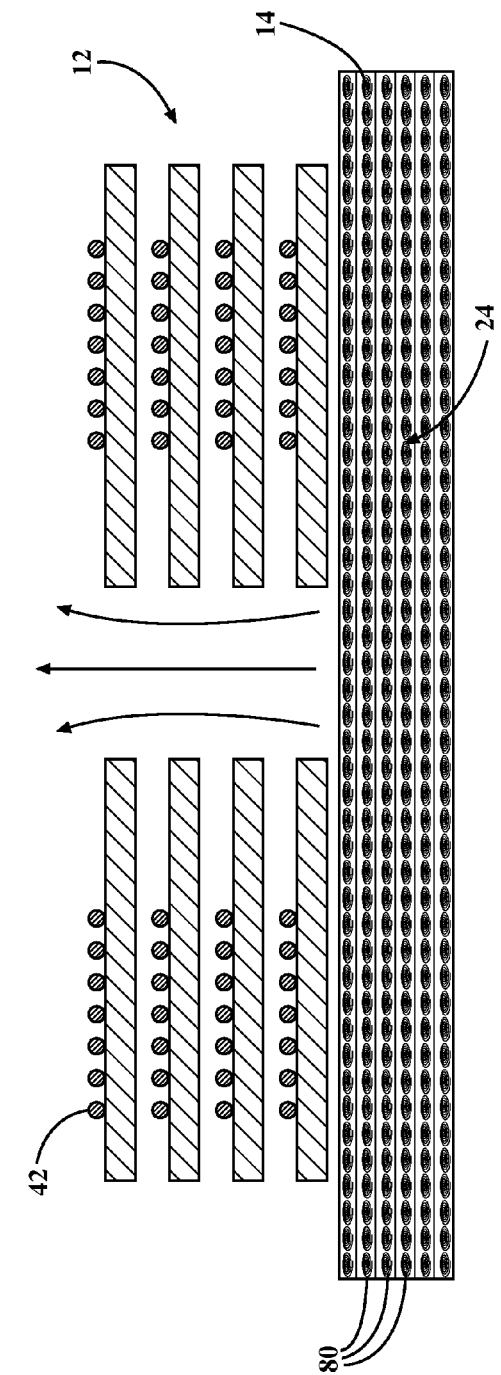

WIRELESS POWER TRANSFER

FIELD OF THE INVENTION

The invention relates to a system for transferring energy wirelessly and, more specifically, using metamaterials designed to improve the efficiency of wireless power transfer.

BACKGROUND OF THE INVENTION

Inductive coupling is often used to wirelessly transfer power between two coils when a wired connection is not convenient or practical. Inductive coupling is made possible by four primary components: a source, a generating coil, a receiving coil, and a drain. The source provides a current which flows through the generating coil to produce an electromagnetic field. The electromagnetic field propagates from the generating coil to the receiving coil and induces a voltage across the receiving coil which is then used to power the drain.

Inductive coupling eliminates the need for direct connections to transfer power and allows for both coils to be fully enclosed and protected. In addition to the convenience of removing external wires, this approach is also used in situations where conditions are prohibitive to conventional electrical connections, such as when the device needs to be impervious to its environment. Devices such as electric toothbrushes, pacemakers, and cochlear implants employ inductive coupling to receive energy wirelessly.

Since the efficiency of the system is primarily dependent upon the strength of the electromagnetic field at the receiving coil, the system is sensitive to misalignment of the coils and further degradation of the field due to uncontrolled propagation. In all the listed applications, the generating coil is placed in close proximity to the receiving coil to charge the device because the effective operable area of energy transfer is relatively small.

Ferrite backings have previously been placed on coils to improve the efficiency of power transfer between coils by reducing the leakage of the electromagnetic field. However, these ferrites are expensive, heavy, and brittle. Furthermore, such systems do not perform well outside of ideal situations and still suffer significant efficiency deterioration when the coils are even slightly misaligned.

Inductive coupling becomes dramatically less efficient if the coils are misaligned or as the distance between the coils increases. Due to these shortcomings, inductive coupling has seen limited use as an alternative to direct wired connections for power transfer.

SUMMARY OF THE INVENTION

In accordance with the invention, a revised coil loop structure is combined with metamaterials designed to contain and redirect the electromagnetic field to produce an improved inductive coupling system. In this way, the efficiency of the inductive power transfer system is increased relative to existing technologies by reducing the negative effects of distance and misalignment.

The revised coil loop structure of the transmitting and receiving coils improves the efficiency of power transfer especially during misalignment. The transmitting and receiving coils are both constructed by connecting a series of printed circuit boards (PCBs). Each layer of PCB represents a single winding of the coil so layers PCB can be added to increase the total windings of the coil.

The individual PCBs are then stacked on top of one another and connected to produce the transmitting and receiving coils. Stacked PCB coils are advantageous compared to traditional wire coils because they do not bend or distort due to their increased rigidity and the PCB coils can be constructed of complex shapes that could not otherwise be produced.

The transmitting and receiving coils further feature a coil shape designed to allow the coils to be actively and variably tuned to one another. Stationary coils are usually tuned to one another but due to the ever-changing variables of real-world operation the transmitting and receiving coils will not always have the same separation distance or alignment relative to one another, making permanent tuning impractical. The active tuning capability overcomes the limitations of permanent tuning and allows the coils to change the frequency and shape of the magnetic field to compensate for misalignment thereby maximizing the efficiency of power transfer.

The efficiency of power transfer in the system is additionally increased through the use of metamaterials. The metamaterial is used as a backing for the coils and reduces the amount of magnetic flux found outside of the power transfer system. Without the metamaterial backing, magnetic flux would leak out the system and be wasted. The metamaterial backing is configured to steer the flux in the direction of the transmission and improve the efficiency of the power transfer.

The metamaterial is made from a spiral unit cell pattern which is printed on a two-sided PCB and repeated throughout the metamaterial. While this metamaterial design is functionally similar to known ferrite backings, it offers many advantages over ferrites. The metamaterial etched on a PCB is lighter and more durable than ferrites in addition to being more cost effective. Etching the metamaterial on a PCB also enables the creation of complex designs and provides the ability to finely tune the properties of the metamaterial.

The metamaterial can be the base layer of the stacked PCB coils or further incorporated onto the individual layers. When etched onto the individual PCB layers of the coil, the metamaterial forms a concentric ring around the coil. When the layers containing both the coil and the metamaterial are stacked on top of the metamaterial base layer, the entire coil is effectively surrounded by the metamaterial on all but one side.

BRIEF DESCRIPTION OF THE DRAWINGS

A better understanding of the present invention will be had upon reference to the following detailed description when read in conjunction with the accompanying drawing, wherein like reference characters refer to like parts throughout the several views, and in which:

FIG. 2 illustrates a cross-sectional view of a coil depicting the unrestrained flow of the electromagnetic field without a metamaterial;

FIG. 3 is a cross-sectional view of a coil demonstrating a preferred embodiment of the present invention with a metamaterial backing;

DETAILED DESCRIPTION OF A PREFERRED EMBODIMENT OF THE PRESENT INVENTION

Figure 1:
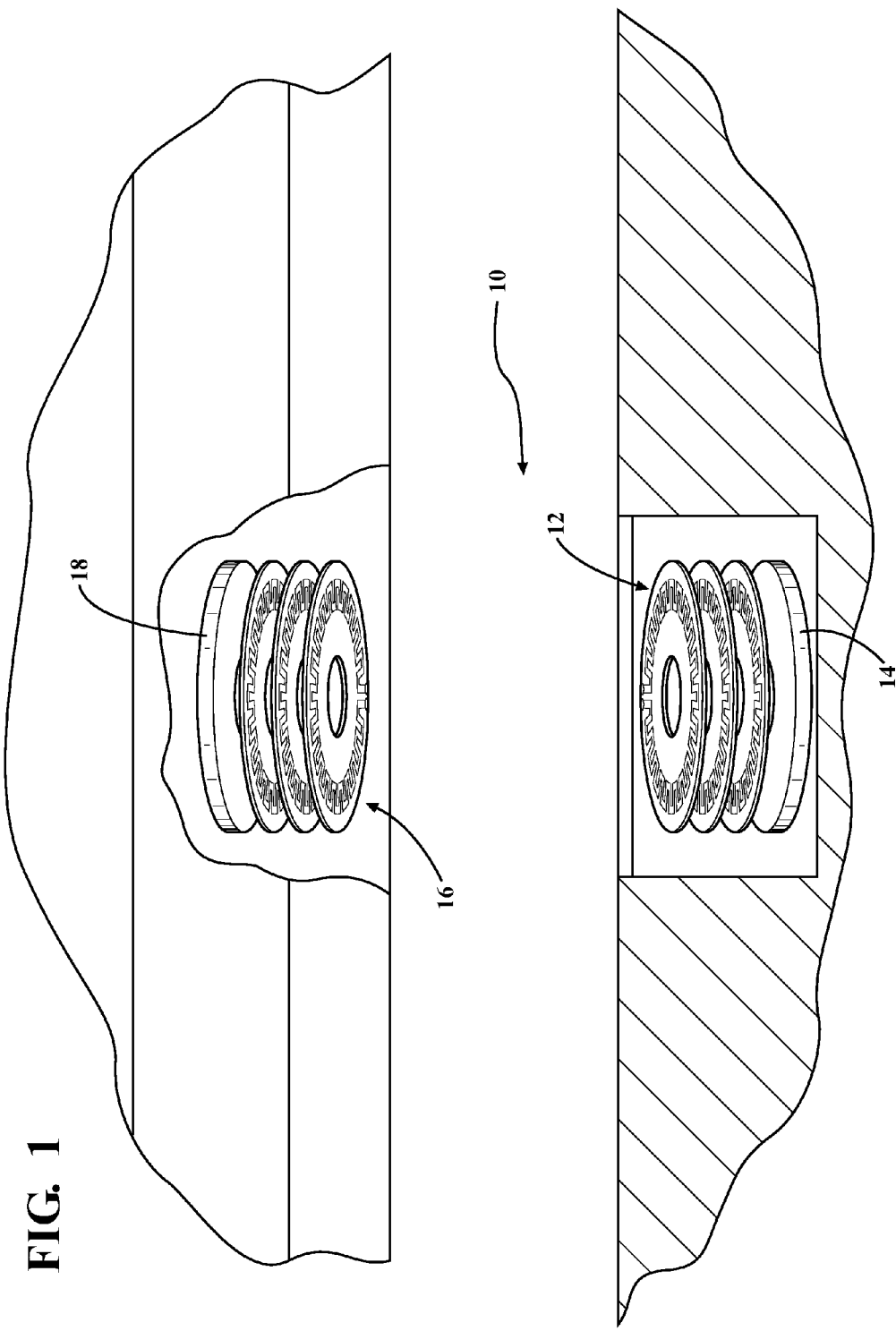
FIG. 1 is a perspective view illustrating a preferred embodiment of the present invention.

With reference first to FIG. 1, a system for wirelessly transferring power 10 is provided. The system 10 includes a transmitting coil 12, a metamaterial structure 14, and a receiving coil 16. The receiving coil 16 may also include a second metamaterial structure 18.

When energized, the transmitting coil 12 generates an electromagnetic field which propagates axially away from the metamaterial structure 14. The metamaterial structure 14 aids in directing the electromagnetic field towards the receiving coil 16 where it induces a current. The metamaterial structure 14 reduces the leakage of magnetic flux 24 out the back of the transmitting coil 12 and improves the efficiency of the power transfer.

FIG. 2 illustrates a cross-sectional view of an energized transmitting coil 12 that lacks a metamaterial structure 14. Without the metamaterial structure 14, magnetic flux leaks 24 out the back of the transmitting coil 12 and is wasted. The unrestrained flux 24 can further generate eddy currents and waste more power than normal.

With reference now to FIG. 3, the metamaterial structure 14 resides in close proximity to an axial end of the transmitting coil 12. The metamaterial structure 14 reduces the amount of flux 24 that leaks out the back on bottom of the transmitting coil 12 and further redirects the electromagnetic field axially away from the metamaterial structure 14.

Figure 4:
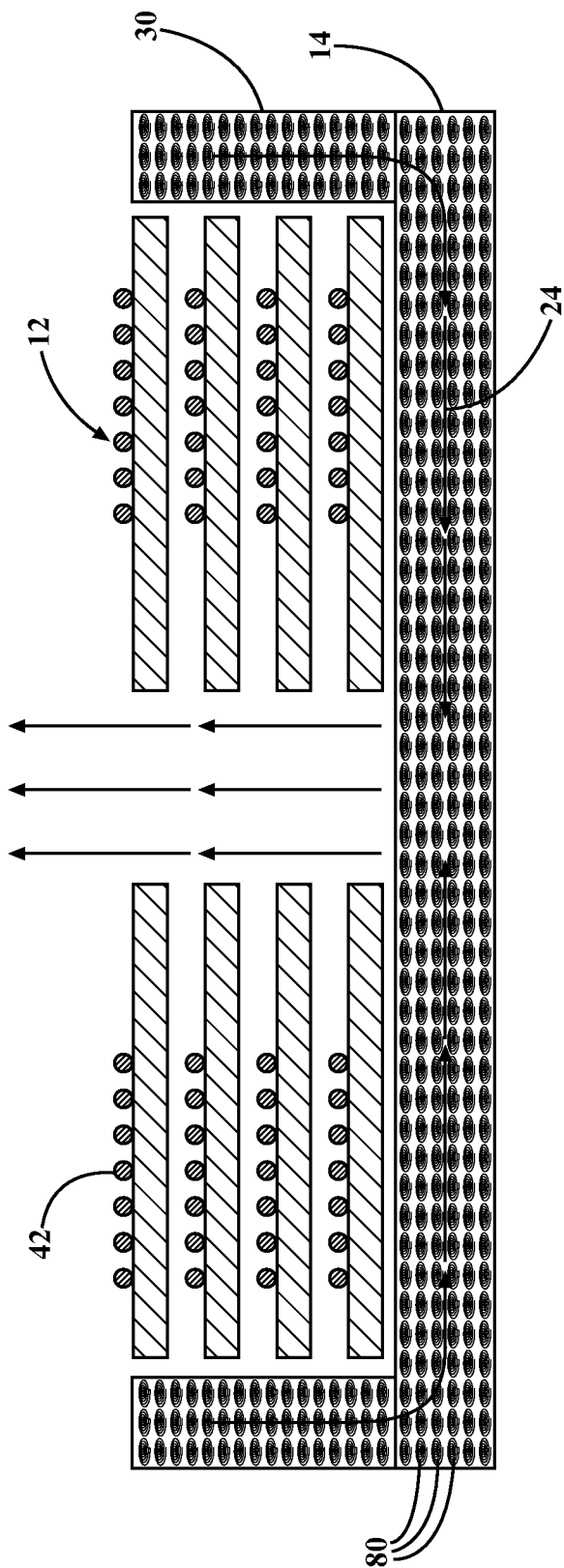
FIG. 4 is a cross-sectional view of a coil demonstrating another preferred embodiment of the present invention with an extended metamaterial structure.

With reference now to FIG. 4, another preferred embodiment is shown wherein an extended metamaterial structure 30 further annularly extends around a portion of the transmitting coil 12 is provided. The extended metamaterial structure 30 contains and redirects the electromagnetic field on the outside of the transmitting coil 12 inwardly which further reduces the power used by the transmitting coil 12 and improves the efficiency of the wireless power transfer system 10.

The transmitting coil 12 and the receiving coil 16 preferably have similar metamaterial configurations. In one embodiment the receiving coil 16 has a second metamaterial structure 18 positioned at an axial end similar to the configuration of the transmitting coil 12 in FIG. 3. The receiving coil 16 optionally has an extended metamaterial structure 30 as shown in FIG. 4.

As with the transmitting coil 12, the second metamaterial structure 18 captures and directs the electromagnetic field into the receiving coil 16. The second metamaterial structure 18 directs the electromagnetic field axially into the receiving coil 16 which improves the efficiency of the wireless power transfer system 10 compared to coils lacking the metamaterial structures 14 and 18.

Electromagnetic coils for inductive coupling are preferably constructed by stacking and interconnecting layers of printed circuit boards (PCBs) with printed loops therein. Compared to traditional wire loop coils these stacked PCB coils are more durable and cost effective. PCB coils also allow for complex coil shapes that could not otherwise be produced with traditional wire loops.

Figure 5:
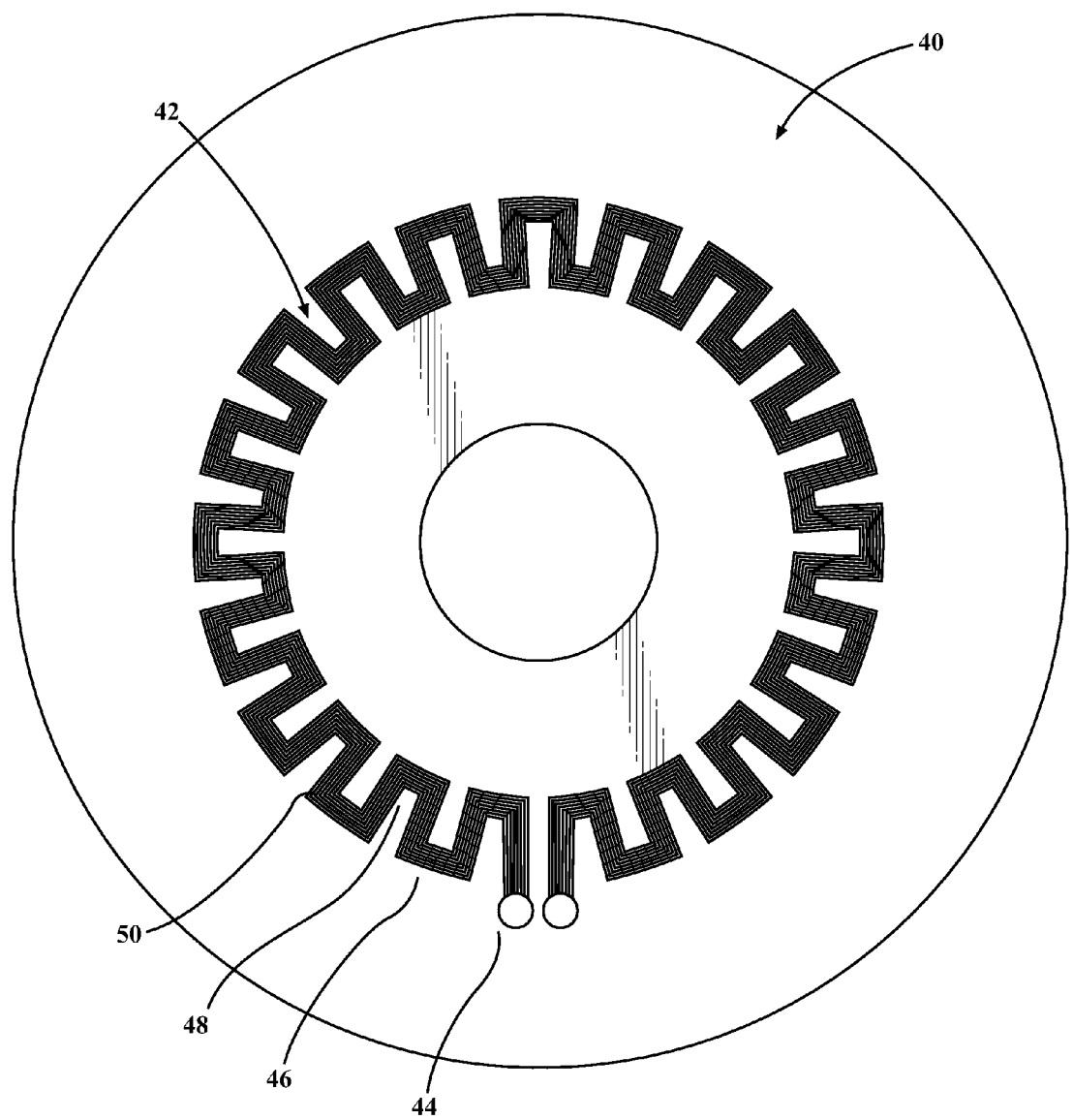
FIG. 5 is a perspective view illustrating a preferred embodiment of the coil shape of the present invention.

The loops of both the transmitting 12 and receiving 16 coils can be assembled by interconnecting individual layers of PCBs. With reference now to FIG. 5, a single layer of PCB coil is shown 40. The main coil 42 is generally circular with a pattern which forms the coil shape.

The coil shape is made up by a continuous series of segments. Outer segments 46 are circumferentially spaced around the coil 42 radially outward from the inner segments 48. The inner segments 48 are positioned so that they reside radially inward from the spaces between the outer segments 46. The outer segments 46 are connected to the inner segments 48 by radial segments 50. The terminal ends of the main coil 42 are connected to contact points 44. These contact points allow multiple layers of coil 40 to be interconnected.

The main coils 42 of the transmitting 12 and receiving coils 16 are designed to allow the coils to be actively and variably tuned to one another. The inward and outward path of the coil 42 allows for lumped components such as varactors to be bridged across the individual segments to create an actively and variably tunable coil. Furthermore, as shown in FIG. 5, in a preferred embodiment the main coil 42 is subdivided into a plurality of individual traces which is analogous to a Litz Wire. This design reduces the skin effect along with the resistance of the coils which in turns means that less power will be dissipated as heat. The capability for active tuning coupled with the individual trace design of the main coil 42 further improves the efficiency of the wireless power transfer system 10.

The efficiency of the power transfer in the system 10 is additionally increased through the use of metamaterials. When positioned around the transmitting 12 and receiving coils 16, the metamaterial reduces the amount of magnetic flux found on the back of the coils. Beyond the inherent loss of efficiency, the unrestrained flux can further generate eddy currents on the back of the coils and waste more power than normal. The metamaterial is designed to contain and redirect the flux and reduce these negative effects. While many known metamaterials need to be powered, the present metamaterial design is passive and does not need to be energized to influence the electromagnetic field.

Figure 6:
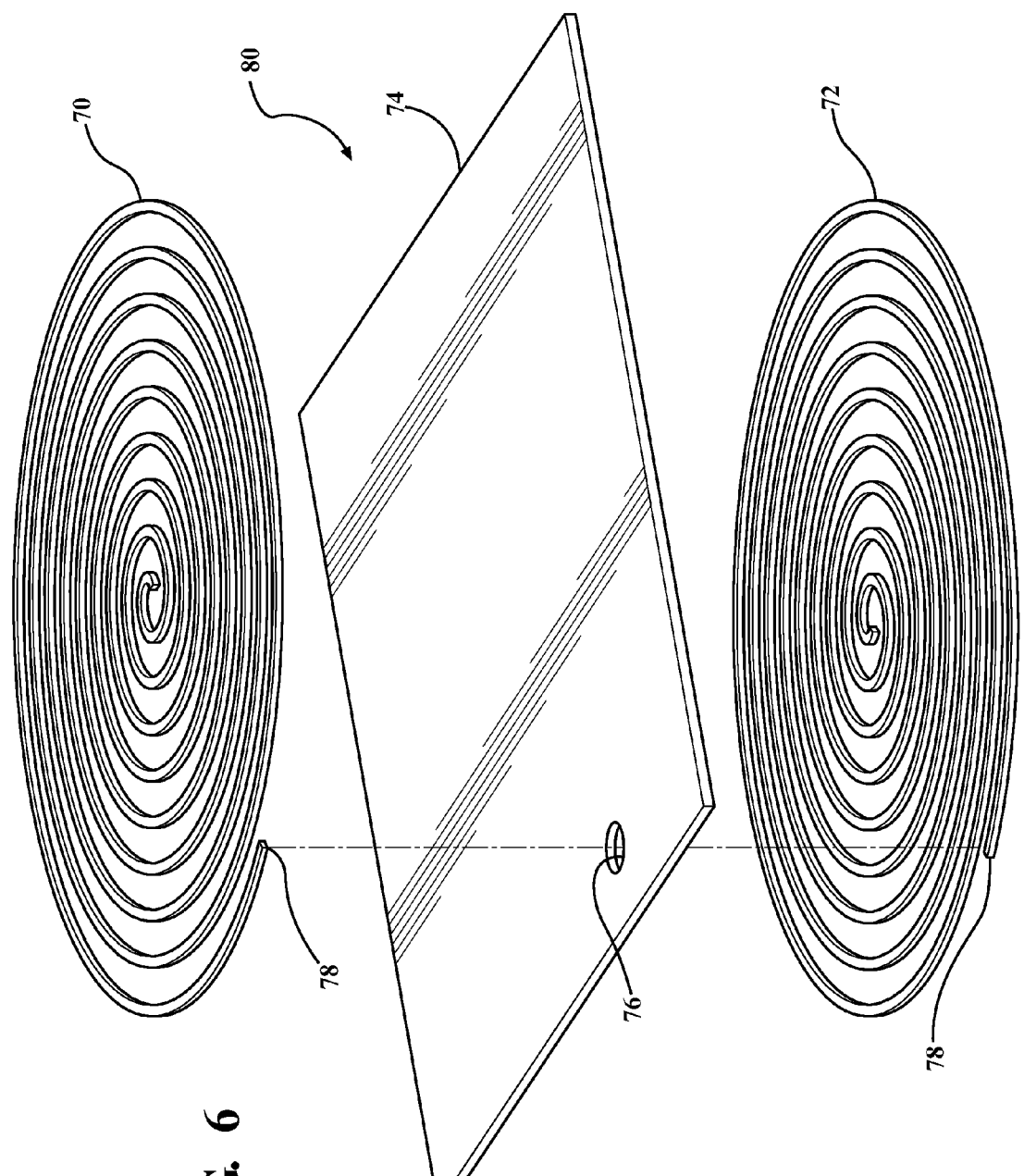
FIG. 6 is an exploded view illustrating a unit cell of the metamaterial of the present invention.

The metamaterial structures 14 and 18 are made up from a unit cell 80 which is repeated throughout the metamaterial. With reference now to FIG. 6, in a preferred embodiment the unit cell 80 of the metamaterial structures is printed on a two-sided PCB 74. The unit cell 80 is made up of a first spiral 70 and a second spiral 72 that are printed on opposite sides of the PCB 74. The first spiral 70 is wound in a first direction and the second spiral 72 is wound in a second direction which is counter to that of the first spiral 70. The spirals 70 and 72 are printed on both sides of the PCB 74 and are connected at their distal ends 78 through a via 76 in the PCB 74. The number of windings along with the size and shape of the spirals dictate the properties of the metamaterial and how it will interact with the electromagnetic field. The metamaterial in this case is passive and reacts when in the presence of an electromagnetic field.

Figure 7:
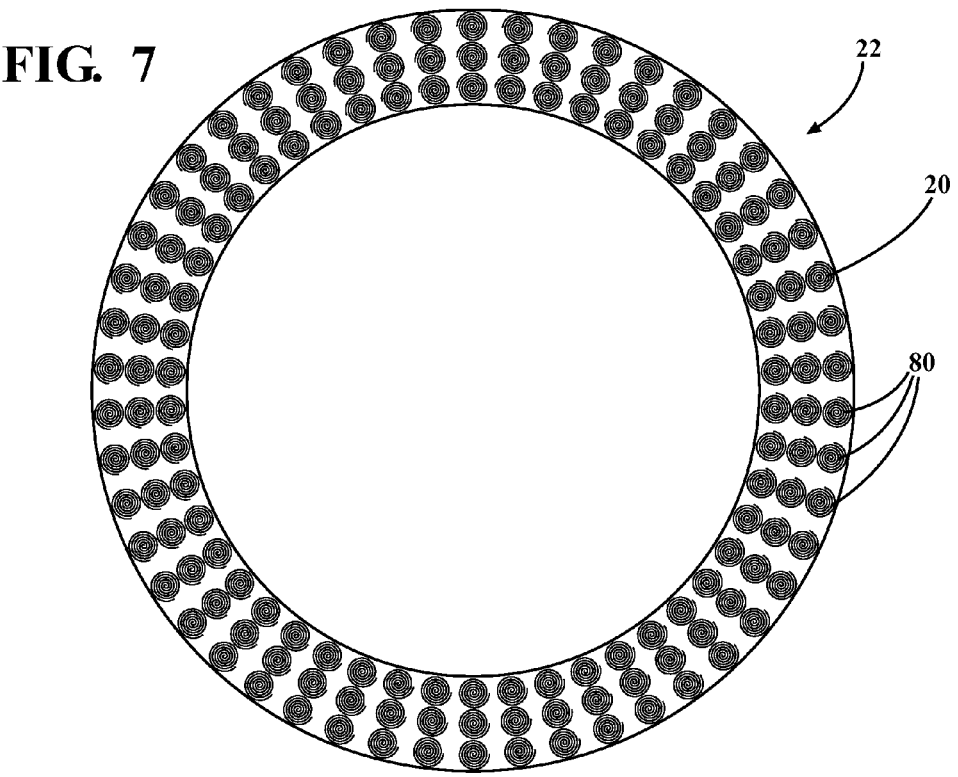
FIG. 7 is a perspective view illustrating a preferred embodiment of the metamaterial ring of the present invention.
Figure 8:
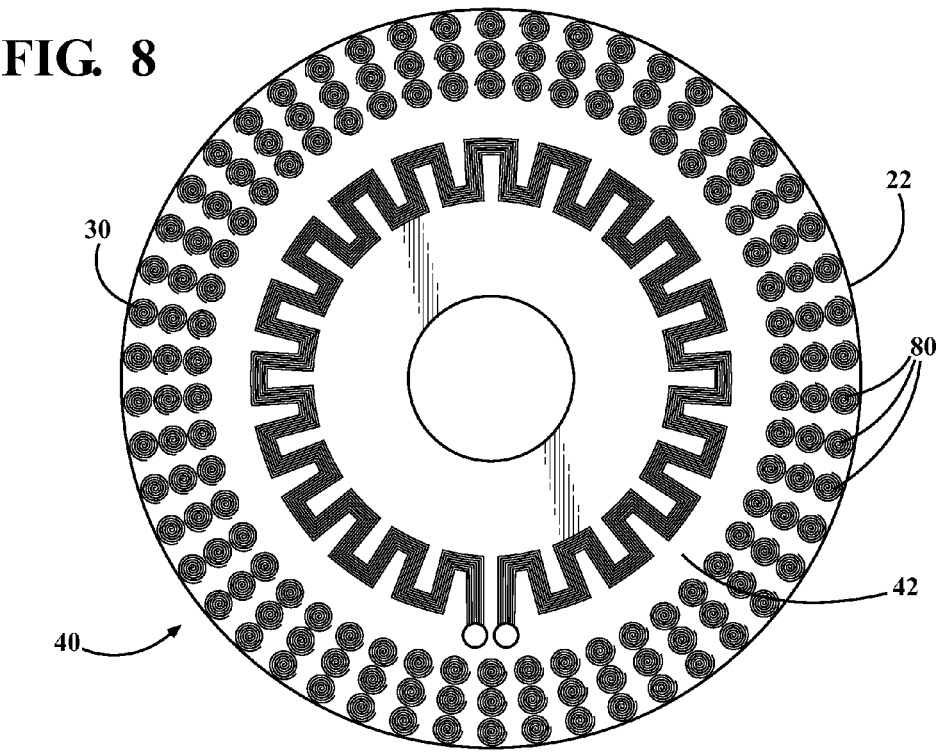
FIG. 8 is a perspective view illustrating a preferred embodiment of the coil surrounded by the metamaterial ring of the present invention.

The unit cell 80 shown in FIG. 6 is repeated throughout both of the metamaterial structures 14 and 18. Layers of the metamaterial pattern 20 are printed on individual layers of the metamaterial structures 14, 18 and then combined to form the backing 14 seen in FIG. 3. As shown in FIG. 7, the metamaterial pattern 20 is also printed as a metamaterial ring 22 to form the extended metamaterial structure 30. FIG. 8 shows a preferred embodiment of a metamaterial ring 22 of the extended metamaterial structure 30 printed on the same PCB 74 as a layer of coil 40. The metamaterial ring 22 is concentric to the main coil 42 and acts to contain and redirect the electromagnetic field generated by the main coil 42.

From the foregoing, it can be seen that the present invention provides a system that combines a revised coil loop structure with metamaterials designed to contain and redirect an electromagnetic field to produce an improved inductive coupling system that improves the efficiency of wireless power transfer. Having described the invention, however, many modifications thereto will become apparent to those skilled in the art to which it pertains without deviation from the spirit of the invention as defined by the scope of the appended claims.

We claim:

1. A system for wirelessly transferring power, comprising:
a first coil wound about a first axis, said first coil generating an electromagnetic field when energized, said first coil having an electrically conductive coil shape disposed on said first coil, the electrically conductive coil shape is subdivided into a plurality of individual parallel electrically conductive traces following said coil shape, the electrically conductive coil shape being formed by a plurality of segments, each of the plurality of segments being coplanar with each other, wherein the plurality of segments are a plurality of outer circumferentially spaced segments, a plurality of inner circumferentially spaced segments radially inward from said outer segments, and a plurality of generally radial segments connecting said outer segments with said inner segments;
at least one lumped component connecting at least one of said generally radial segments of said coil shape;
a first metamaterial structure disposed at an axial end of said first coil, said first metamaterial structure directing said electromagnetic field axially away from said first metamaterial structure; and
a second coil wound about a second axis, said second axis being coaxial with said first axis, said second coil spaced apart from said first coil, said second coil having an electrically conductive coil shape, said second coil generating a current when energized by said electromagnetic field.

2. The system of claim 1, further comprising:
a second metamaterial structure disposed at an axial end of said second coil, said second metamaterial structure directing said electromagnetic field axially away from said second metamaterial structure.

3. The system of claim 2, further comprising:
a portion of said first metamaterial structure extends annularly around a portion of said first coil.

4. The system of claim 3, further comprising:
a portion of said second metamaterial structure extends annularly around a portion of said second coil.

5. The system of claim 4, wherein said at least one first coil and second coil further comprise:
a plurality of printed circuit boards, each having the electrically conductive coil shape printed thereon.

6. The system of claim 1, wherein said at least one first metamaterial structure and second metamaterial structure further comprise:
a printed circuit board, a first metamaterial pattern on a first side of said printed circuit board, and a second metamaterial pattern on a second side of said printed circuit board.

7. The system of claim 6, further comprising:
said first metamaterial structure resides on at least one of the printed circuit board of said first coil forming a concentric ring of said first metamaterial structure around said first coil.

8. The system of claim 7, further comprising:
at least one of said first metamaterial pattern and said second metamaterial pattern are formed by a repeated pattern of an individual cell.

9. The system of claim 8, further comprising:
said individual cell is a spiral, having a center and a distal end.

10. The system of claim 9, further comprising:
said spirals of said first metamaterial pattern are wound in a first direction.

11. The system of claim 10, further comprising:
said spirals of said second metamaterial pattern are wound in a second direction, said second direction counter to said first direction.

12. The system of claim 11, further comprising:
said spirals of said first metamaterial pattern are connected to said spirals of said second metamaterial pattern by a via at said distal end of said spirals.

13. The system of claim 6, further comprising:
said second metamaterial structure resides on at least one of the printed circuit board layers of said second coil forming a concentric ring of said second metamaterial structure.

* * * * *